(12) United States Patent
Tsai

(10) Patent No.: US 9,004,446 B2
(45) Date of Patent: Apr. 14, 2015

(54) SLIDING VALVE DEVICE

(75) Inventor: Ming-Chih Tsai, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 696 days.

(21) Appl. No.: 13/303,961

(22) Filed: Nov. 23, 2011

(65) Prior Publication Data

US 2012/0161046 A1 Jun. 28, 2012

(30) Foreign Application Priority Data

Dec. 24, 2010 (TW) .............................. 99145696 A

(51) Int. Cl.
*F16K 31/02* (2006.01)
*F16K 31/528* (2006.01)
*F16K 31/06* (2006.01)
*F16K 3/02* (2006.01)

(52) U.S. Cl.
CPC ........... *F16K 31/0682* (2013.01); *F16K 3/0254* (2013.01); *F16K 3/0218* (2013.01); *F16K 31/0668* (2013.01)

(58) Field of Classification Search
CPC ... F16K 3/0218; F16K 3/0254; F16K 3/0281; F16K 3/262; F16K 3/26; F16K 3/02; F16K 3/182; F16K 11/0655; F16K 31/0682; F16K 31/0668
USPC ........... 251/129.19, 128.2, 229, 232, 78, 319, 251/237, 129.2
See application file for complete search history.

(56) References Cited

U.S. PATENT DOCUMENTS

| | | | | |
|---|---|---|---|---|
| 307,009 | A * | 10/1884 | Bond | 251/232 |
| 313,313 | A * | 3/1885 | Gannaway | 137/61 |
| 1,472,788 | A * | 11/1923 | Brotz | 290/40 F |
| 1,501,303 | A * | 7/1924 | Berry | 251/70 |
| 1,550,725 | A * | 8/1925 | Jung | 251/176 |
| 2,121,392 | A * | 6/1938 | Ashworth | 261/39.1 |
| 2,342,765 | A * | 2/1944 | Stewart | 188/195 |
| 2,358,999 | A * | 9/1944 | Ray | 335/251 |
| 2,373,001 | A * | 4/1945 | Allen | 74/89.37 |
| 2,406,246 | A * | 8/1946 | Ogden | 200/61.86 |
| 2,851,959 | A * | 9/1958 | Kangas | 417/111 |
| 3,143,131 | A * | 8/1964 | Spencer | 137/269 |
| 3,684,237 | A * | 8/1972 | Hyde et al. | 251/58 |
| 6,578,818 | B1 * | 6/2003 | Krimmer et al. | 251/129.2 |
| 6,682,047 | B1 * | 1/2004 | Piscaer et al. | 251/326 |
| 2004/0069358 | A1 * | 4/2004 | Knapp et al. | 137/625.17 |
| 2011/0011476 | A1 * | 1/2011 | Brondum | 137/801 |

FOREIGN PATENT DOCUMENTS

TW 369448 9/1999
TW 200944679 11/2009

* cited by examiner

*Primary Examiner* — Craig Schneider
*Assistant Examiner* — Frederick D Soski
(74) *Attorney, Agent, or Firm* — Kirton McConkie; Evan R. Witt

(57) ABSTRACT

A sliding valve device includes a fixing portion, a sliding component and a driving member. The fixing portion has an inlet port and an outlet port. The sliding component is connected with the fixing portion, and includes a fluid channel. The driving member is used for driving movement of the sliding component, wherein the driving member is not in contact with the fluid channel, the inlet port and the outlet port.

15 Claims, 7 Drawing Sheets

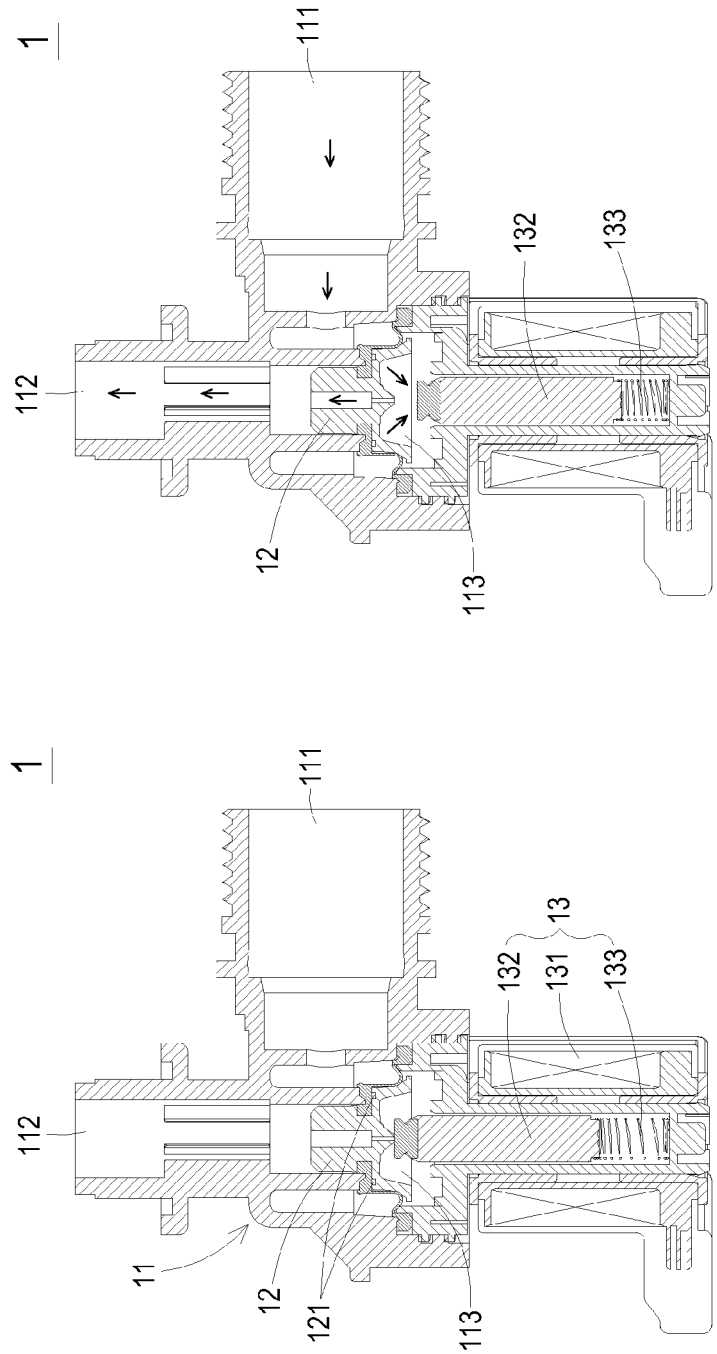

9,004,446 B2

SLIDING VALVE DEVICE

FIELD OF THE INVENTION

The present invention relates to a valve device, and more particularly to a sliding valve device.

BACKGROUND OF THE INVENTION

Generally, valve devices are used for regulating the flow of a fluid (e.g. gas or liquid) by opening, closing, or partially obstructing various passageways. Valve devices are widely found in household applications, industrial applications or other applications. For example, faucets and waterway gate valves are found in regular applications. In addition, check valves, regulating valves or water control valves are widely used in industrial applications.

As known, a water solenoid valve is one of the most common valve devices. FIG. 1A is a schematic view illustrating a normally-closed water solenoid valve according to the prior art. The water solenoid valve 1 includes a valve body 11, a rubber pad 12 and a solenoid valve 13. The valve body 11 includes an inlet port 111 and an outlet port 112. The solenoid valve 13 includes a solenoid coil 131, a plunger 132 and a spring 133. The plunger 132 is axially movable with respect to the solenoid coil 131. The rubber pad 12 is installed within the valve body 11. The valve body 11 is connected with the solenoid valve 13. The rubber pad 12 is in an annular structure and arranged between the valve body 11 and the solenoid valve 13 for preventing leakage of the water.

Normally, water is introduced into a fluid receptacle 113 between the rubber pad 12 and the solenoid coil 131 through the inlet port 111 and the perforations 121 of the rubber pad 12. When an electric current flows through the solenoid coil 131, a magnetic field is created by the solenoid coil 131. The magnetic field causes the plunger 132 to be internally drawn back with respect to the solenoid coil 131. As the plunger 132 is internally drawn back, the water stored in the fluid receptacle 113 is outputted through the rubber pad 12 and the outlet port 112 (see FIG. 1B). Whereas, when the electric current is stopped, the plunger 132 is pushed out with respect to the solenoid coil 131 in response to a restoring force of the spring 133. As the plunger 132 is pushed out, the rubber pad 12 is sealed by the plunger 132. Under this circumstance, the fluid receptacle 113 is not in communication with the outlet port 112, and thus the water is stored in the fluid receptacle 113 and fails to be outputted.

Although the water solenoid valve 1 is effectively to regulate the flow of a fluid, there are still some drawbacks. For example, since the metallic components (e.g. the plunger 132 and the spring 133) are immersed in the water, the metallic components are readily corroded to result in breakdown of the water solenoid valve 1. In addition, the water temperature and the residual chemical substance of the water may gradually degrade the rubber pad 12. Since the rubber pad 12 is very thin, the impact of intermittent pressure may deform the rubber pad 12. Under this circumstance, the rubber pad 12 is damaged and thus the water solenoid valve 1 is failed. Moreover, as the pressure of the water flowing through the water solenoid valve 1 is increased, the power consumption is increased.

That is, the drawbacks of the conventional water solenoid valve include immersion of some metallic components (e.g. the plunger and the spring) in water, degradation of the rubber pad by the water temperature and the residual chemical substance of the water, deformation resulting from the impact of intermittent pressure, and high power consumption for driving the plunger.

SUMMARY OF THE INVENTION

The present invention provides a sliding valve device with prolonged use life and reduced power consumption.

In accordance with an aspect of the present invention, there is provided a sliding valve device. The sliding valve device includes a fixing portion, a sliding component and a driving member. The fixing portion has an inlet port and an outlet port. The sliding component is connected with the fixing portion, and includes a fluid channel. The driving member is used for driving movement of the sliding component relative to the fixing portion, wherein the driving member is not in direct contact with the fluid channel, the inlet port and the outlet port.

In accordance with another aspect of the present invention, there is provided a sliding valve device. The sliding valve device includes a fixing portion comprising a first fixing portion and a second fixing portion, a sliding component and a driving member. The first fixing portion has an inlet port. The second fixing portion has an outlet port. The sliding component is arranged between the first fixing portion and the second fixing portion, and includes a fluid channel. The driving member is used for driving movement of the sliding component relative to the fixing portion, wherein the driving member is not in contact with the fluid channel, the inlet port and the outlet port.

The above contents of the present invention will become more readily apparent to those ordinarily skilled in the art after reviewing the following detailed description and accompanying drawings, in which:

BRIEF DESCRIPTION OF THE DRAWINGS

FIG. 1A is a schematic view illustrating a normally-closed water solenoid valve according to the prior art;

FIG. 1B is a schematic view illustrating the water solenoid valve of FIG. 1A in an open status;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2A:
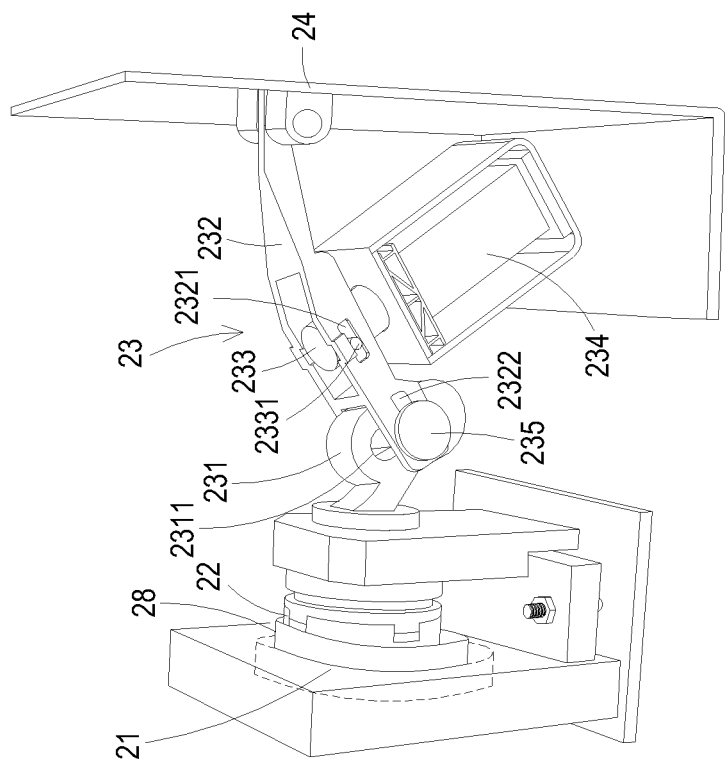
FIG. 2A is a schematic perspective view illustrating a sliding valve device according to a first embodiment of the present invention, in which the sliding component is moved upwardly to a first position.
Figure 2B:
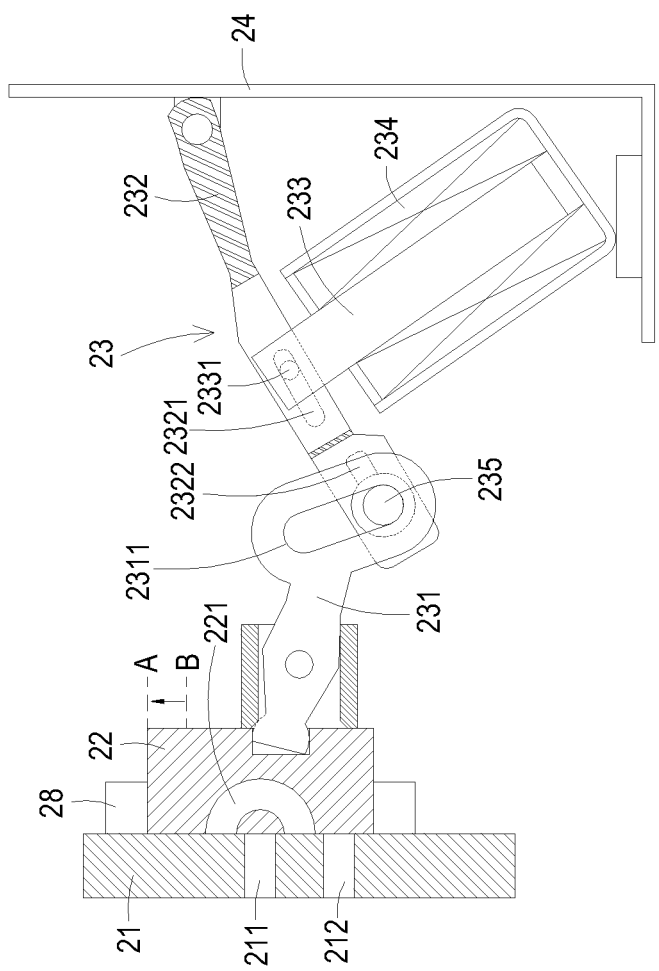
FIG. 2B is a schematic partial cross-sectional view illustrating the sliding valve device of FIG. 2A.

FIG. 2A is a schematic perspective view illustrating a sliding valve device according to a first embodiment of the present invention. FIG. 2B is a schematic partial cross-sectional view illustrating the sliding valve device of FIG. 2A. As shown in FIGS. 2A and 2B, the valve device 2 includes a fixing portion 21, a sliding component 22 and a driving member 23. The fixing portion 21 includes an inlet port 211 and an outlet port 212. Through the inlet port 211, a fluid may be introduced into the valve device 2. Through the outlet port 212, the fluid may be exhausted from the valve device 2. The sliding component 22 includes a fluid channel 221. The fluid channel 221 is selectively in communication with the inlet port 211 and the outlet port 212 of the fixing portion 21. The driving member 23 is used for driving movement of the sliding component 22, thereby controlling the open/close status of the valve device 2. In the open status of the valve device 2, the fluid channel 221 of the sliding component 22 is in communication with the inlet port 211 and the outlet port 212 of the fixing portion 21. Whereas, in the close status of the valve device 2, the fluid channel 221 of the sliding component 22 is disconnected from the inlet port 211 and the outlet port 212 of the fixing portion 21. By opening or closing the passageway, the valve device 2 is capable of regulating the flow of the fluid.

In this embodiment, the fixing portion 21 has one inlet port 211 and one outlet port 212. It is noted that the numbers of the inlet port and the outlet port may be varied according to the practical requirements. For example, in some embodiments, the fixing portion has plural inlet ports and one outlet port. Alternatively, the fixing portion has plural inlet ports and plural outlet ports. Alternatively, the fixing portion has one inlet port and plural outlet ports. In a case that the fixing portion has plural inlet ports and one outlet port, the valve device can be used for mixing different fluids, for example mixing cold water and hot water as warm water. Whereas, in a case that the fixing portion has one inlet port and plural outlet ports, the valve device can be used for directing the fluid from one source to multiple destinations. Whereas, in a case that the fixing portion has plural inlet ports and plural outlet ports, the valve device can be used for mixing different fluids or directing the fluid from one source to multiple destinations according to the practical requirements.

Moreover, in some embodiments, the fixing portion 21 is composed of several components, wherein the inlet port 211 and the outlet port 212 are formed in different components.

Figure 2C:
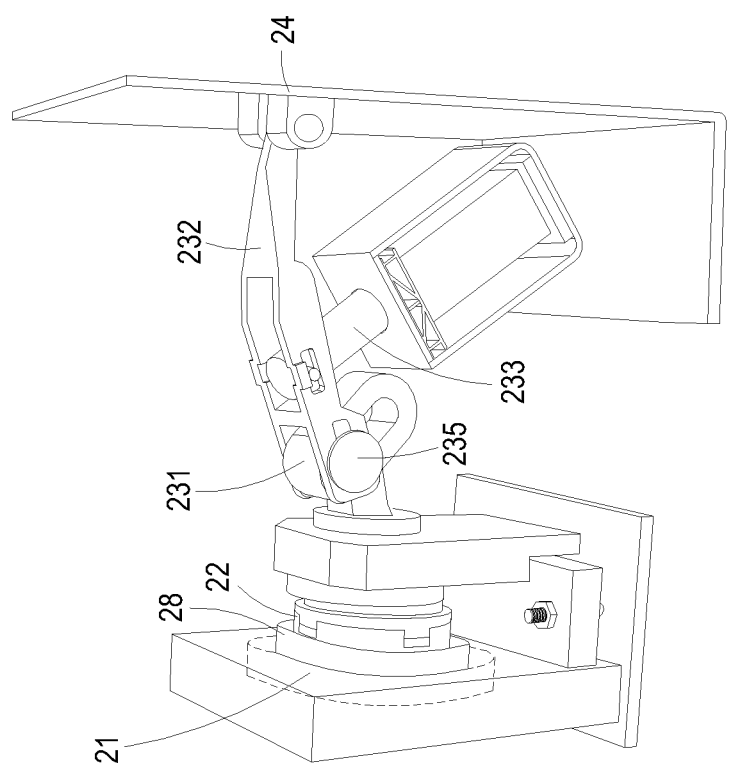
FIG. 2C is a schematic perspective view illustrating a sliding valve device of FIG. 2A, in which the sliding component is moved downwardly to a second position.
Figure 2D:
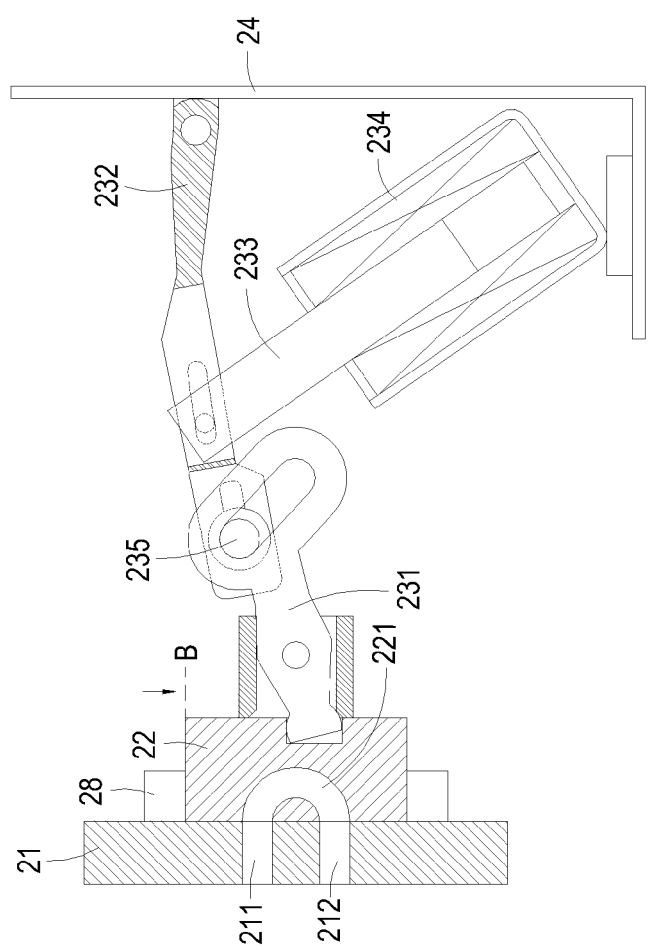
FIG. 2D is a schematic partial cross-sectional view illustrating the sliding valve device of FIG. 2C.

In an embodiment, the sliding component 22 is made of ceramic material or polytetrafluoroethene (PTFE). The sliding component 22 is slid or rotated between a first position A and a second position B (see FIGS. 2B and 2D). The fluid channel 221 is for example a U-shaped channel or a continuous channel with at least two openings. It is noted that the sliding component 22 may be slid or rotated between more than two positions.

When the sliding component 22 is slid from the second position B to the first position A, the two openings of the fluid channel 221 are not respectively aligned with the inlet port 211 and the outlet port 212 of the fixing portion 21 (see FIG. 2B). In this situation, the fluid channel 221 is not in communication with the inlet port 211 and the outlet port 212 so that the fluid fails to be transferred by the valve device 2. Whereas, when the sliding component 22 is slid from the first position A to the second position B, the two openings of the fluid channel 221 are respectively aligned with the inlet port 211 and the outlet port 212 of the fixing portion 21 (see FIGS. 2C and 2D). In this situation, the fluid channel 221 is in communication with the inlet port 211 and the outlet port 212 so that the fluid can be transferred by the valve device 2.

The driving member 23 is used for driving the horizontal sliding motion of the sliding component 22 by means of solar energy, elastic force, magnetic force or electric power. Hereinafter, the operation of the driving member 23 by means of magnetic force will be illustrated with reference to FIGS. 2A and 2B. In this embodiment, the driving member 23 is an electromagnetic driving member. The sliding component 22 is moved by the driving member 23 according to a lever principle. In this embodiment, the driving member 23 includes a pushing part 231, a transmission element 232, a plunger 233 and a magnetic body 234. The magnetic body 234 is arranged around the plunger 233. An example of the magnetic body 234 is a ring magnet or an electromagnet. The plunger 233 and a magnetic body 234 define a keep solenoid.

A first end of the transmission element 232 is fixed on a fixing component 24. In addition, the transmission element 232 has a first slot 2321 and a second slot 2322. A protrusion 2331 of the plunger 233 is accommodated within the first slot 2321 so that the transmission element 232 is connected with the plunger 233. The second slot 2322 is formed in a second end of the transmission element 232. By penetrating a fastening element 235 through the second slot 2322 of the transmission element 232 and the third slot 2311 of the pushing part 231, the transmission element 232 and the pushing part 231 are synchronously moved. In addition, a second end of the pushing part 231 is connected with the sliding component 22. Consequently, in response to the movement (rotation) of the pushing part 231 driven by the transmission element 232, the sliding component 22 is linearly moved.

It is noted that numerous modifications of the driving member 23 may be made while retaining the teachings of the invention. That is, any driving member that drives movement of the sliding component 22 can be used as the driving member 23 of the present invention.

Optionally, the valve device 2 further includes a protecting element 28. The protecting element 28 is connected with the sliding component 22 and the fixing portion 21 for preventing the fluid from leaking through the region between the sliding component 22 and the fixing portion 21. Moreover, either or both of the contact surfaces between the sliding component 22 and the fixing portion 21 may be ground or polished in order to minimize the friction force between the sliding component 22 and the fixing portion 21.

Please refer to FIGS. 2A and 2B. When an electric current flows through the magnetic body 234, a magnetic field is created by the magnetic body 234. The magnetic field causes the plunger 233 to be internally drawn back. As the plunger 233 is internally drawn back, the sliding component 22 is moved from the second position B to the first position A. Under this circumstance, the fluid channel 221 is no longer in communication with the inlet port 211 and the outlet port 212 of the fixing portion 21 so that the fluid fails to be transferred by the valve device 2. Whereas, when the electric current is stopped, the plunger 233 is pushed out by an elastic element such as a spring (not shown). As the plunger 233 is pushed out, the sliding component 22 is slid from the first position A to the second position B. Under this circumstance, the fluid channel 221 is in communication with the inlet port 211 and the outlet port 212 of the fixing portion 21 so that the fluid can be transferred by the valve device 2.

From the above description, since the sliding component 22 is slid or rotated between the first position A and the second position B, the sliding component 22 functions as a switch to regulate the flow of the fluid by opening or closing the fluid channel. Since the switching action causes shear stress on the fluid, the loading of the switching action is considerably small when compared with the prior art technology. That is, the power consumption of the present invention is reduced. In accordance with the present invention, since the driving member is disposed outside the fluid channel, the driving member is not in direct contact with the fluid. Under this circumstance, the possibility of degrading or aging the driving member is minimized, and thus the use life of the valve device will be prolonged. Moreover, since the sliding component 22 is made of ceramic material or polytetrafluoroethene (PTFE), the possibility of degrading or aging the driving member is further reduced and the use life of the valve device will be further prolonged.

Figure 3A:
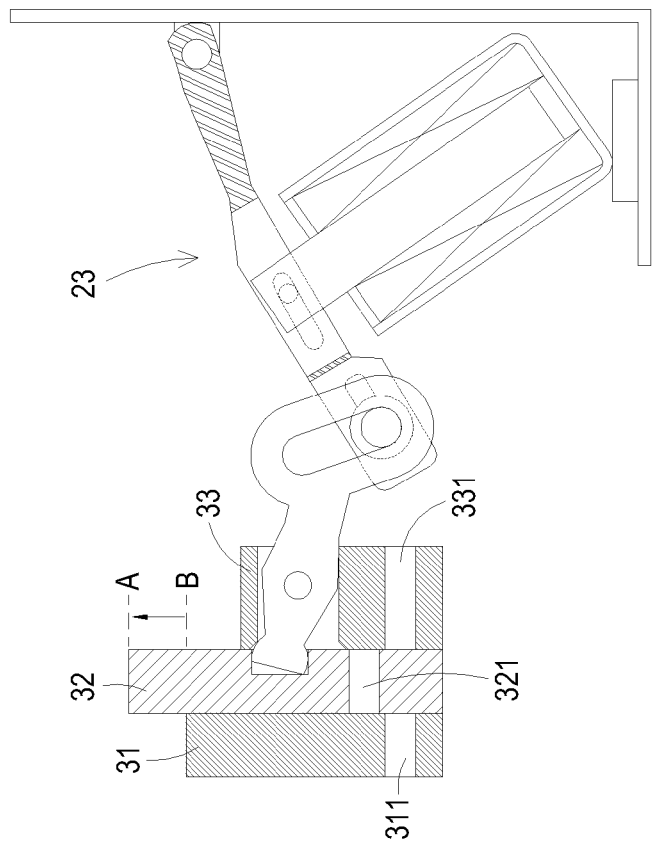
FIG. 3A is a schematic partial cross-sectional view illustrating a sliding valve device according to a second embodiment of the present invention, in which the sliding component is moved upwardly to a first position.
Figure 3B:
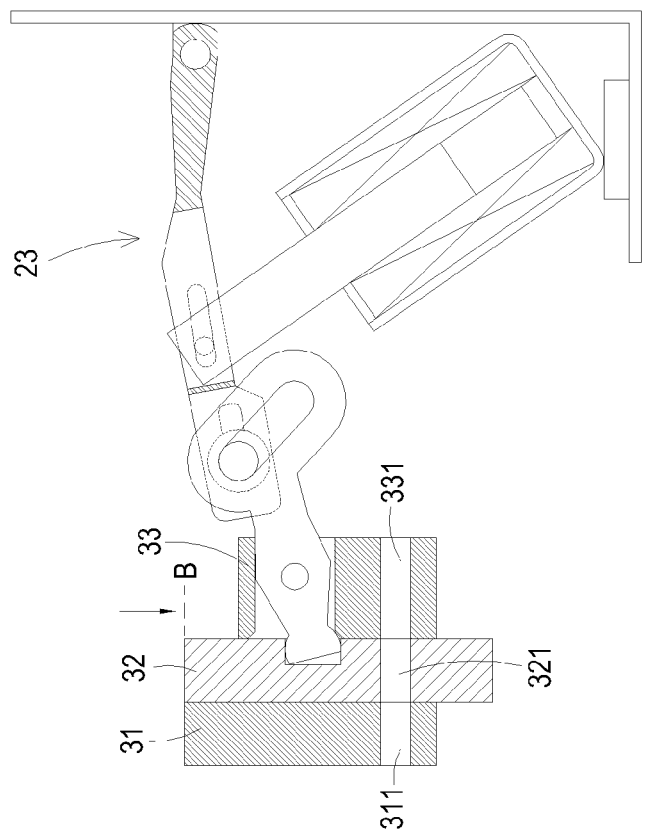
FIG. 3B is a schematic partial cross-sectional view illustrating a sliding valve device of FIG. 3A, in which the sliding component is moved downwardly to a second position.

FIG. 3A is a schematic partial cross-sectional view illustrating a sliding valve device according to a second embodiment of the present invention, in which the sliding component is moved upwardly to a first position. FIG. 3B is a schematic partial cross-sectional view illustrating a sliding valve device of FIG. 3A, in which the sliding component is moved downwardly to a second position. As shown in FIGS. 3A and 3B, the valve device 3 includes a first fixing portion 31, a sliding component 32, a second fixing portion 33 and a driving member 23. The configurations and the operating principles of the driving member 23 are similar to those of the first embodiment, and are not redundantly described herein.

In this embodiment, the sliding component 32 is arranged between the first fixing portion 31 and the second fixing portion 33, and movable with respect to the first fixing portion 31 and the second fixing portion 33. The inlet port 311 is formed in the first fixing portion 31. The outlet port 331 is formed in the second fixing portion 33. In this embodiment, the fluid channel 321 is for example a linear channel, a U-shaped channel or a continuous channel with at least two openings. The sliding component 32 is slid or rotated between a first position A and a second position B (see FIGS. 3A and 3B), thereby achieving the function of regulating the flow of the fluid.

From the above description, the sliding valve device of the present invention is capable of regulating the flow of a fluid by sliding or rotating the sliding component between a first position and a second position to open or close the fluid channel. Consequently, the use life of the valve device is prolonged. Moreover, since the driving member is disposed outside the fluid channel, the driving member is not in direct contact with the fluid. Under this circumstance, the use life of the valve device will be further prolonged.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A sliding valve device, comprising:
a fixing portion having an inlet port and an outlet port;
a sliding component connected with said fixing portion, and comprising a fluid channel; and
a driving member for driving movement of said sliding component relative to said fixing portion, wherein said driving member is not in direct contact with said fluid channel, said inlet port and said outlet port;
wherein said driving member comprises a transmission element, a plunger and a pushing part, wherein said transmission element is connected with said plunger and said pushing part, a first end of said transmission element is fixed on a fixing component, said plunger has a protrusion, said transmission element has a first slot and a second slot, and said pushing part has a third slot, wherein said protrusion of said plunger is accommodated within said first slot so that said transmission element is connected with said plunger, wherein said second slot is formed in a second end of said transmission element, wherein a fastening element is penetrated through said second slot of said transmission element and said third slot of said pushing part so that said transmission element and said pushing part are synchronously moved, wherein said pushing part is connected with said sliding component, wherein as said plunger is drawn back or pushed out, said pushing part is driven to move said sliding component.

2. The sliding valve device according to claim 1, wherein said sliding component is made of ceramic material or polytetrafluoroethene.

3. The sliding valve device according to claim 1, wherein said sliding component is slid or rotated between a first position and a second position.

4. The sliding valve device according to claim 1, wherein said sliding component is moved by said driving member according to a lever principle.

5. The sliding valve device according to claim 1, wherein said driving member is an electromagnetic driving member.

6. The sliding valve device according to claim 1, wherein said driving member further comprises a magnetic body, which is arranged around said plunger for drawing back or pushing out said plunger.

7. The sliding valve device according to claim 1, wherein said valve device further comprises a protecting element connected with said sliding component and said fixing portion for preventing a fluid from leaking through a region between said sliding component and said fixing portion.

8. The sliding valve device according to claim 1, wherein said fluid channel is a linear channel, a U-shaped channel or a continuous channel with at least two openings.

9. The sliding valve device according to claim 1, wherein said driving member is used for driving movement of said sliding component relative to said fixing portion by means of solar energy, elastic force, magnetic force or electric power.

10. A sliding valve device, comprising:
a fixing portion comprising a first fixing portion and a second fixing portion, wherein said first fixing portion has an inlet port, and said second fixing portion has an outlet port;
a sliding component arranged between said first fixing portion and said second fixing portion, and comprising a fluid channel; and
a driving member for driving movement of said sliding component relative to said fixing portion, wherein said driving member is not in contact with said fluid channel, said inlet port and said outlet port;
wherein said driving member comprises a transmission element, a plunger and a pushing part, wherein said transmission element is connected with said plunger and said pushing part, a first end of said transmission element is fixed on a fixing component, said plunger has a protrusion, said transmission element has a first slot and a second slot, and said pushing part has a third slot, wherein said protrusion of said plunger is accommodated within said first slot so that said transmission element is connected with said plunger, wherein said second slot is formed in a second end of said transmission element, wherein a fastening element is penetrated through said second slot of said transmission element and said third slot of said pushing part so that said transmission element and said pushing part are synchronously moved, wherein said pushing part is connected with said sliding component, wherein as said plunger is drawn back or pushed out, said pushing part is driven to move said sliding component.

11. The sliding valve device according to claim 10, wherein said sliding component is made of ceramic material or polytetrafluoroethene.

12. The sliding valve device according to claim 10, wherein said sliding component is slid or rotated between a first position and a second position.

13. The sliding valve device according to claim 10, wherein said sliding component is moved by said driving member according to a lever principle.

14. The sliding valve device according to claim 10, wherein said driving member further comprises a magnetic body, which is arranged around said plunger for drawing back or pushing out said plunger.

15. The sliding valve device according to claim 10, wherein said fluid channel is a linear channel, a U-shaped channel or a continuous channel with at least two openings.

\* \* \* \* \*